United States Patent
Wakabayashi

(10) Patent No.: US 7,361,699 B2
(45) Date of Patent: Apr. 22, 2008

(54) WATER-BASED INK

(75) Inventor: Shigemi Wakabayashi, Wakayama (JP)

(73) Assignee: Kao Corporation, Tokyo (JP)

( * ) Notice: Subject to any disclaimer, the term of this patent is extended or adjusted under 35 U.S.C. 154(b) by 68 days.

(21) Appl. No.: 10/743,076

(22) Filed: Dec. 23, 2003

(65) Prior Publication Data

US 2004/0138338 A1 Jul. 15, 2004

(30) Foreign Application Priority Data

Dec. 27, 2002 (JP) ............................. 2002-382311

(51) Int. Cl.
*C09D 11/00* (2006.01)
(52) U.S. Cl. ...................... 523/160; 523/161
(58) Field of Classification Search ................ 523/160, 523/161
See application file for complete search history.

(56) References Cited

U.S. PATENT DOCUMENTS

| 4,246,154 | A | | 1/1981 | Yao |
| 5,852,074 | A | | 12/1998 | Tsutsumi et al. |
| 5,889,083 | A | * | 3/1999 | Zhu ........................... 523/161 |
| 5,973,025 | A | | 10/1999 | Nigam et al. |
| 5,990,202 | A | * | 11/1999 | Nguyen et al. ............. 523/201 |
| 5,998,501 | A | | 12/1999 | Tsutsumi et al. |
| 6,090,193 | A | | 7/2000 | Nigam et al. |
| 6,117,222 | A | | 9/2000 | Nigam et al. |
| 6,743,875 | B2 | * | 6/2004 | Johnson et al. ............. 526/240 |
| 6,764,173 | B2 | * | 7/2004 | Chen et al. ................. 347/100 |
| 2002/0025994 | A1 | * | 2/2002 | Ishizuka et al. ............ 523/160 |
| 2003/0055178 | A1 | | 3/2003 | Gore et al. |
| 2003/0106462 | A1 | * | 6/2003 | Yatake et al. ............. 106/31.59 |
| 2003/0149133 | A1 | * | 8/2003 | Lau et al. .................... 523/160 |
| 2004/0132942 | A1 | * | 7/2004 | Sakakibara et al. ......... 526/332 |

FOREIGN PATENT DOCUMENTS

| EP | 1172421 A1 | * | 1/2002 |
| JP | 54-58504 | | 5/1979 |
| JP | 9-241565 | | 9/1997 |
| JP | 9-286939 | | 11/1997 |
| JP | 10-279873 | | 10/1998 |
| WO | WO 01/96483 A1 | * | 12/2001 |

OTHER PUBLICATIONS

Patent Abstracts of Japan, JP 7-034023, Feb. 3, 1995.

* cited by examiner

*Primary Examiner*—Edward J. Cain
(74) *Attorney, Agent, or Firm*—Oblon, Spivak, McClelland, Maier & Neustadt, P.C.

(57) ABSTRACT

A water-based ink containing an aqueous dispersion of polymer particles of a water-insoluble polymer having an alkyl group of at least 20 carbon atoms in its side chain, and a hydrophobic dye. The water-based ink of the present invention can be suitably used as, for instance, an ink for inkjet recording, and the like.

16 Claims, No Drawings

WATER-BASED INK

FIELD OF THE INVENTION

The present invention relates to a water-based ink. More specifically, the present invention relates to a water-based ink which can be suitably used as, for instance, an ink for inkjet recording, and the like.

BACKGROUND OF THE INVENTION

A water-based ink containing an aqueous dispersion of polymer particles containing a hydrophobic dye (hereinafter referred to as "dispersion of a dye-containing polymer") has some characteristics such as water resistance and sharpness which are characteristics of the dispersion of a dye-containing polymer, and vividness, good color reproducibility and high optical density which are characteristics of the dye-based ink. As an example of a water-based ink in which the dispersion of a dye-containing polymer as described above is used, there have been known a colorant in which a vinyl polymer is impregnated with a hydrophobic dye as disclosed in Japanese Patent Laid-Open No. 54-058504; a dispersion of a dye-containing polymer, in which a water-dispersible polyester is impregnated with a water-insoluble dye as disclosed in Japanese Patent Laid-Open No. 07-34023; and a dispersion of a dye-containing polymer, in which a graft copolymer is used as a water-insoluble polymer as disclosed in Japanese Patent Laid-Open No. 08-035081, Japanese Patent Laid-Open No. 08-048498 and Japanese Patent Laid-Open No. 09-024680.

However, in a water-based ink, in particular, a water-based ink for use in inkjet recording, a water-soluble organic solvent for controlling the permeability of ink on paper (hereinafter referred to as permeability controlling solvent), a surfactant and the like are used as well as a dispersion of a dye-containing polymer. As the permeability controlling solvent, generally, a glycol ether, 2-pyrrolidone, isopropanol and the like have been used. However, these solvents plasticize the water-insoluble polymer. Therefore, the resin is plasticized and swelled when these solvents are used in an ink. As a result, the aqueous dispersion is degraded, which results in problems of increase in the viscosity of ink, increase in the particle diameter of dispersion, and even sedimentation of the polymer due to aggregation in the worst case.

Also, in the conventional dispersions of a dye-containing polymer, when the solvent as described above is used in an ink, the hydrophobic dye incorporated in the dispersed resin is dissolved in the solvent and extracted to the liquid phase. Therefore, the conventional inks have a problem that the dye is separated out when they are stored for a long period of time. As for the surfactant, when a nonionic surfactant having a low HLB is used, such nonionic surfactant causes degradation of the dispersion as in the above case, and the same problems arise.

SUMMARY OF THE INVENTION

The present invention provides a water-based ink containing an aqueous dispersion of polymer particles of a water-insoluble polymer having an alkyl group of at least 20 carbon atoms in its side chain, and a hydrophobic dye.

DETAILED DESCRIPTION OF THE INVENTION

The present invention relates to a water-based ink containing an aqueous dispersion of polymer particles of a water-insoluble polymer having an alkyl group of at least 20 carbon atoms in its side chain, and a hydrophobic dye.

The water-based ink of the present invention is excellent in, for instance, storage stability and color tone, and exhibits high optical density and provides a printout having excellent rubbing resistance. Also, the water-based ink of the present invention is excellent in, for instance, printing reliability in addition to the above-mentioned properties when used for inkjet recording.

The water-based ink of the present invention contains an aqueous dispersion of polymer particles of a water-insoluble polymer, and a hydrophobic dye. One of the major characteristics of the water-based ink of the present invention resides in that the water-insoluble polymer has an alkyl group of at least 20 carbon atoms in its side chain. The water-insoluble polymer is preferably a polymer showing the water-dispersibility in water after at least a part of the salt-forming groups described below are preferably neutralized.

The hydrophobic dye is contained in the water-based ink. For instance, (1) the hydrophobic dye is contained in polymer particles of a water-insoluble polymer having an alkyl group of at least 20 carbon atoms in its side chain (hereinafter simply referred to as "water-insoluble polymer"), and the polymer particles are contained in the water-based ink in the form of an aqueous dispersion (hereinafter referred to as "aqueous dispersion of dye-containing polymer particles"). Alternatively, (2) the hydrophobic dye is dispersed in water with a surfactant or a water-soluble polymer, to form an aqueous dispersion of the hydrophobic dye, and the aqueous dispersion is contained in the water-based ink together with an aqueous dispersion of polymer particles of a water-insoluble polymer.

Since the water-insoluble polymer as described above is used in the water-based ink of the present invention, physical properties of a color material are stabilized even when various organic solvents are added to the water-based ink, so that optical density, bleeding resistance and feathering are improved, thereby exhibiting high optical density.

The number of carbon atoms of alkyl group existing in the side chain of the water-insoluble polymer is at least 20, preferably at least 22, from the viewpoint of storage stability of a water-based ink. Also, the aqueous dispersion contains a polymer prepared by polymerizing a monomer composition containing a monomer having an alkyl group of at least 20 carbon atoms and a monomer copolymerizable with this alkyl group-containing monomer. Therefore, the number of carbon atoms of the alkyl group is preferably at most 30, more preferably at most 28, still more preferably at most 26, from the viewpoint of promoting the polymerization with a copolymerizable monomer or the conversion into an alkyl side chain having at least 20 carbon atoms. From these viewpoints, the number of carbon atoms of the alkyl group existing in the side chain of the water-insoluble polymer is at least 20, preferably 20 to 30, more preferably 20 to 26, still more preferably 22 to 26.

The alkyl group in the side chain may be either linear or branched. The alkyl group is preferably linear from the viewpoint of storage stability in the water-based ink.

Representative examples of a preferred water-insoluble polymer include a polymer having a recurring unit [hereinafter referred to as recurring unit (I)] represented by the formula (II):

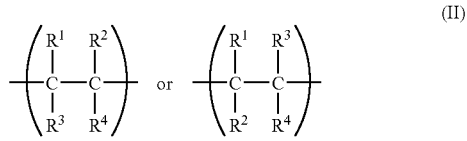

wherein each of $R^1$ and $R^2$ is independently hydrogen atom or methyl group; $R^3$ is hydrogen atom, carboxyl group, a —$COOR^5$ group wherein $R^5$ is an alkyl group having at least 20 carbon atoms, or a —$CONR^5R^6$ group wherein $R^5$ is as defined above and $R^6$ is hydrogen atom, an alkyl group or an aryl group; $R^4$ is a —$COOR^5$ group wherein $R^5$ is as defined above, or a —$CONR^5R^6$ group wherein $R^5$ and $R^6$ are as defined above, and a recurring unit of salt-forming group.

$R^4$ is a —$COOR^5$ group or a —$CONR^5R^6$ group. Since $R^5$ constitutes the alkyl group in the side chain, $R^5$ is an alkyl group having at least 20 carbon atoms, preferably an alkyl group having 20 to 30 carbon atoms, more preferably an alkyl group having 20 to 26 carbon atoms.

$R^6$ is hydrogen atom, an alkyl group or an aryl group. Among the alkyl groups, an alkyl group having 1 to 30 carbon atoms is preferable, and an alkyl group having 1 to 26 carbon atoms is more preferable. Among the aryl groups, an aryl group having 6 to 12 carbon atoms is preferable, and an aryl group having 6 to 8 carbon atoms is more preferable.

The water-insoluble polymer can be prepared by, for instance, 1. a preparation process 1 which comprises polymerizing a monomer composition containing (A) a monomer which is formed into the recurring unit (I) after polymerization [hereinafter referred to as "monomer (I)"], (B) a salt-forming group-containing monomer which is formed into the recurring unit of the salt-forming group after polymerization, and (C) a monomer copolymerizable with (A) the monomer (I) and (B) the salt-forming group-containing monomer [hereinafter referred to as "copolymerizable monomer"]; and 2. a preparation process 2 which comprises polymerizing a monomer composition containing (A) a functional group-containing monomer [hereinafter referred to as "monomer (I) P"] which is formed into the recurring unit (I) after reaction (for instance, a monomer having an acid anhydride or an acid halide), and if necessary, (B) the salt-forming group-containing monomer, (C) a monomer copolymerizable with the monomer (I) P and the salt-forming group-containing monomer [hereinafter referred to as "monomer copolymerizable with the monomer (I) P and the like"], and reacting the resulting polymer with a primary or secondary amine having an alkyl group having at least 20 carbon atoms or an aliphatic alcohol having at least 20 carbon atoms.

Representative examples of a preferred water-insoluble polymer include a vinyl polymer prepared by copolymerizing a monomer composition containing a monomer represented by the formula (I):

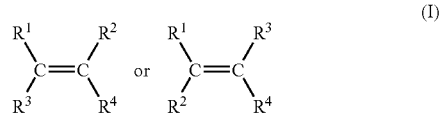

wherein $R^1$, $R^2$, $R^3$ and $R^4$ are as defined above [hereinafter referred to as monomer (I)], a salt-forming group-containing monomer, and a monomer copolymerizable with the monomer (I) and the salt-forming group-containing monomer.

Preferred examples of the monomer (I) include behenyl methacrylate, behenyl acrylate, monobehenyl maleate and dibehenyl maleate. These monomers can be used alone or in admixture of at least two kinds. Among these monomers, behenyl methacrylate and behenyl acrylate are more preferable from the viewpoints of storage stability in the water-based ink and copolymerization ability.

The salt-forming group-containing monomer includes anionic monomers and cationic monomers. The anionic monomers include unsaturated carboxylic acid monomers, unsaturated sulfonic acid monomers, unsaturated phosphoric acid monomers and the like. Representative examples of the unsaturated carboxylic acid monomers include acrylic acid, methacrylic acid, crotonic acid, itaconic acid, maleic acid, fumaric acid, citraconic acid, 2-methacryloyloxymethyl succinic acid, their anhydrides and salts, and the like. The unsaturated sulfonic acid monomers include styrenesulfonic acid, 2-acrylamide-2-methylpropylsulfonic acid, 3-sulfopropyl (meth)acrylate, bis(3-sulfopropyl) itaconate, their salts and the like; sulfonic acid monoester of 2-hydroxyethyl (meth)acrylic acid, and salts thereof. The unsaturated phosphoric acid monomers include vinylphosphonic acid, vinyl phosphate, bis(methacryloxyethyl) phosphate, diphenyl-2-methacryloyloxyethyl phosphate, dibutyl-2-acryloyloxyethyl phosphate, dioctyl-2-(meth)acryloyloxyethyl phosphate and the like. These salt-forming group-containing monomers can be used alone or in admixture of at least two kinds. Among these salt-forming group-containing monomers, the unsaturated carboxylic acid monomers having an anionic salt-forming group, such as methacrylic acid and acrylic acid, are preferable from the viewpoints of copolymerization ability and storage property.

It is preferable that the salt-forming group of the salt-forming group-containing monomer is neutralized. As a neutralizing agent, an acid or a base can be used in accordance with the kind of the salt-forming group. The acid includes inorganic acids such as hydrochloric acid and sulfuric acid; and organic acids such as acetic acid, propionic acid, lactic acid, succinic acid, glycollic acid, gluconic acid and glyceric acid. The base includes tertiary amines such as trimethylamine and triethylamine, ammonia, sodium hydroxide, potassium hydroxide, and the like.

The neutralization degree of the salt-forming group is not limited to specified ones. It is preferable that the neutralization degree is adjusted so that the aqueous dispersion of the dye-containing polymer particles is usually neutral, for instance, the pH of the aqueous dispersion is 4 to 10.

The solubility of the water-insoluble polymer in water at 25° C. after the neutralization of the salt-forming group to a desired neutralization degree is preferably at most 15% by weight, more preferably at most 10% by weight, still more preferably at most 5% by weight, even more preferably at most 1% by weight, from the viewpoint of water resistance.

The above-mentioned copolymerizable monomer include, for instance, (meth)acrylates having an alkyl group of 1 to 18 carbon atoms, such as methyl (meth)acrylate, ethyl(meth)acrylate, (iso)propyl(meth)acrylate, (iso or tertiary)butyl (meth)acrylate, (iso)amyl(meth)acrylate, cyclohexyl(meth)acrylate, benzyl(meth)acrylate, 2-ethylhexyl(meth)acrylate, (iso)octyl(meth)acrylate, (iso)decyl(meth)acrylate, (iso)dodecyl(meth)acrylate, (iso)stearyl(meth)acrylate, (iso)myristyl(meth)acrylate, (iso)cetyl(meth)acrylate, 2-hydroxyethyl(meth)acrylate and 3-hydroxypropyl(meth)acrylate; and styrenic monomers such as styrene, vinyltoluene, 2-methylstyrene and chlorostyrene; and the like. These monomers can be used alone or in admixture of at least two kinds.

The above-mentioned "(iso or tertiary)" and "(iso)" are intended to mean both of the case where these groups are present and the case where these groups are absent. When these groups are absent, the monomer is in the form of normal.

The monomer (I) P includes halogenated (meth)acrylates. The monomer (I) P is reacted with an alcohol or an amine after the polymerization, to be formed into a recurring unit derived from the (meth)acrylate or a recurring unit derived from the (meth)acrylic acid amide.

In the preparation process 1, it is desired that the amount of the monomer (I) is 20 to 80 parts by weight, preferably 30 to 70 parts by weight, the amount of the salt-forming group-containing monomer is 2 to 20 parts by weight, preferably 5 to 15 parts by weight, and the amount of the copolymerizable monomer is 5 to 78 parts by weight, preferably 15 to 65 parts by weight, based on the total amount 100 parts by weight of the monomer (I), the salt-forming group containing monomer and the copolymerizable monomer, from the viewpoints of copolymerization ability, storage property and mixing stability in the water-based ink.

In the preparation process 2, the amount of the monomer (I) P in the preparation process 2 is equal to the amount of the monomer (I) in the preparation process 1, the amount of the salt-forming group-containing monomer in the preparation process 2 is equal to the amount of the salt-forming group-containing monomer in the preparation process 1, and the amount of the monomer copolymerizable with the monomer (I) P and the like in the preparation process 2 is equal to the amount of the copolymerizable monomer in the preparation process 1.

The water-insoluble polymer can be prepared, for instance, by the following processes:

[Preparation Processes 1]

i) a process for copolymerizing a monomer composition containing a (meth)acrylate having an alkyl group of at least 20 carbon atoms or (meth)acrylic amide;

ii) a process for copolymerizing a monomer composition containing a maleate having an alkyl group of at least 20 carbon atoms or maleic amide;

iii) a process for copolymerizing a monomer composition containing a reaction product obtained by the reaction of an aliphatic alcohol having at least 20 carbon atoms or a primary or secondary amine having an alkyl group of at least 20 carbon atoms with a halogenated (meth)acrylate or maleic anhydride;

iv) a process for copolymerizing a monomer composition containing a reaction product obtained by the reaction of a monomer having an epoxy group, such as glycidyl (meth)acrylate, with a fatty acid having an alkyl group of at least 20 carbon atoms.

[Preparation Processes 2]

v) a process for copolymerizing a monomer composition containing a halogenated (meth)acrylate or maleic anhydride, and reacting the resulting polymer with an aliphatic alcohol having at least 20 carbon atoms or a primary or secondary amine having an alkyl group of at least 20 carbon atoms.

The water-insoluble polymer can be obtained by polymerizing the above-mentioned monomer composition by a known polymerization method such as a bulk polymerization method, a solution polymerization method, a suspension polymerization method or an emulsion polymerization method.

Among these polymerization methods, the solution polymerization method is preferable. The solvent used for the solution polymerization method include aliphatic alcohols such as ethanol and propanol; ketones such as acetone, methyl ethyl ketone and methyl isobutyl ketone; esters such as ethyl acetate; aromatic solvents such as benzene and toluene; and the like. These organic solvents can be used alone or in admixture of at least two kinds.

In the polymerization, a radical polymerization initiator is usually used. The polymerization initiator includes azo compounds such as 2,2'-azobisisobutyronitrile, 2,2'-azobis (2,4-dimethylvaleronitrile), 2,2'-azobis(4-methoxy-2,4-dimethylvaleronitrile), dimethyl-2,2'-azobisbutyrate, 2,2'-azobis (2-methylbutyronitrile) and 1,1'-azobis(1-cyclohexanecarbonitrile). Also, as the polymerization initiator, a radical polymerization initiator such as organic peroxides such as t-butyl peroxyoctoate, dicumyl peroxide, di-t-butyl peroxide and dibenzoyl oxide.

It is desired that the amount of the polymerization initiator is 0.001 to 2.0% by weight, preferably 0.01 to 1.5% by weight, of the total amount of the monomers.

In the polymerization, a polymerization chain transfer agent can be used. Representative examples of the polymerization chain transfer agent include mercaptans such as octyl mercaptan, n-dodecyl mercaptan, t-dodecyl mercaptan, n-hexadecyl mercaptan, n-tetradecyl mercaptan and t-tetradecyl mercaptan; xanthogenndisulfides such as dimethyl xanthogenndisulfide, diethyl xanthogenndisulfide and diisopropyl xanthogenndisulfide; thiuram disulfides such as tetramethyl thiuram disulfide, tetraethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer (preferably those containing at least 50% by weight of 2,4-diphenyl-4-methyl-1-pentene), 9,10-dihydroanthracene, 1,4-dihydronaphthalene, indene and 1,4-cyclohexadiene; unsaturated heterocyclic compounds such as xanthene and 2,5-dihydrofuran; and the like. These polymerization chain transfer agents can be used alone or in admixture of at least two kinds.

The polymerization conditions cannot be absolutely determined because the conditions differ depending upon the type of the radical polymerization initiator, the monomers and the solvent, and the like. Usually, the polymerization temperature is preferably 30° to 100° C., more preferably 50° to 80° C., and the polymerization time is 1 to 10 hours or so.

It is preferable that the atmosphere for polymerization is an atmosphere of an inert gas such as nitrogen gas.

After the termination of the polymerization reaction, the formed polymer can be isolated from the reaction solution by a known method such as re-precipitation or removal of a solvent. Also, the resulting polymer can be purified to remove unreacted monomers and the like from the polymer by the repeat of re-precipitation, membrane separation, a chromatographic method, an extraction method or the like.

The polymer thus obtained has a weight-average molecular weight of preferably 3000 to 80000, more preferably 3000 to 50000, from the viewpoints of avoiding scorching on the printer head, improving the durability of the ink after printing and facilitating the formation of the dispersion.

In addition, it is preferable that the water-insoluble polymer has an anionic salt-forming group and an acid value of 30 to 120 mg KOH/g from the viewpoints of storage stability and jetting stability.

Examples of the hydrophobic dye include oil-soluble dyes, disperse dyes and the like. The solubility at 20° C. of the hydrophobic dye in an organic solvent which is used for dissolving the hydrophobic dye when preparing an aqueous dispersion is preferably at least 2 g/L, more preferably 20 to 500 g/L.

The kind of the oil-soluble dyes is not limited to the specified ones. Preferable oil-soluble dyes include, for instance, black dyes such as C.I. Solvent Black 3, 7, 27, 29 and 34, Nigrosine black dyes; C.I. Solvent Yellow 14, 16, 19, 29, 30, 56, 82, 93 and 162; C.I. Solvent Red 1, 3, 8, 18, 24, 27, 43, 49, 51, 72, 73 109, 122, 132 and 218; C.I. Solvent Violet 3; C.I. Solvent Blue 2, 11 25, 35 and 70; C.I. Solvent Green 3 and 7; C.I. Solvent Orange 2; and the like. More preferable oil-soluble dyes include yellow dyes such as C.I. Solvent Yellow 29 and 30, cyan dyes such as C.I. Solvent Blue 70, magenta dyes such as C.I. Solvent Red 18 and 49, and black dyes such as C.I. Solvent Black 3 and Nigrosine black dyes.

Commercially available oil-soluble dyes include, for instance, Nubian Black PC-0850, Oil Black HBB, Oil Black 860, Oil Yellow 129, Oil Yellow 105, Oil Pink 312, Oil Red 5B, Oil Scarlet 308, Vali Fast Blue 2606, Oil Blue BOS [hereinabove commercially available from Orient Chemical Co., Ltd.]; Neopen Yellow 075, Neopen Mazenta SE1378, Neopen Blue 807, Neopen Blue FF4012, Neopen Cyan FF4238 [hereinabove commercially available from BASF]; and the like.

The disperse dye used in the present invention are not limited to those listed below. Representative examples of preferred disperse dye include, for instance, C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1 and 9; and the like.

The hydrophobic dye having a preferred structure is at least one dye selected from the group consisting of the copper phthalocyanine dyes (C.I. Solvent Blue 70), quinophthalone dyes and xanthene dyes because the range of color reproducibility is wide.

The aqueous dispersion of the dye-containing polymer particles can be prepared by a generally known method for preparing a resin emulsion, such as a forced emulsion method, a phase inversion emulsion method, an emulsion polymerization method or a suspension polymerization method. Specifically, the aqueous dispersion of the dye-containing polymer particles can be prepared by dissolving a water-insoluble polymer and a hydrophobic dye in an organic solvent, adding a neutralizing agent to the resulting solution as occasion demands, to ionize a salt-forming group of the water-insoluble polymer, adding water thereto, thereafter dispersing the resulting solution using a dispersing apparatus or an ultrasonic emulsifier as occasion demands, and distilling off the organic solvent to phase-invert to a water-based system.

The emulsifier for dispersion includes a common ultrasonic emulsifier, an ultra high pressure homogenizer, a membrane emulsifier and the like. Among the emulsifiers, Microfluidizer (commercially available from Microfluidizer, trade name), Nanomizer (commercially available from Tokushu Kika Kogyo Co. Ltd., trade name), an ultrasonic homogenizer (commercially available from NIPPON SEIKI SEISAKUSHO) and the like are preferred.

The amount of the hydrophobic dye in the aqueous dispersion of the dye-containing polymer particles is preferably 5 to 900 parts by weight, more preferably 25 to 400 parts by weight, still more preferably 10 to 400 parts by weight, based on 100 parts by weight of the resin solid content of the vinyl polymer, from the viewpoints of optical density and facilitating the incorporation of the dye into the polymer particles.

Also, the solid content of the aqueous dispersion of the dye-containing polymer particles in the water-based ink is preferably 0.5 to 30% by weight, more preferably 1 to 20% by weight, still more preferably 1 to 10% by weight, from the viewpoints of jetting stability and optical density.

It is preferable that the average particle diameter of the aqueous dispersion of the dye-containing polymer particles is 20 to 200 nm from the viewpoint of dispersion stability.

The minimum filmforming temperature of the aqueous dispersion of the dye-containing polymer particles is not limited to specified ones, and preferably at least 10° C.

The water-based ink can be obtained by mixing the aqueous dispersion of the dye-containing polymer particles, a permeability controlling solvent, a surfactant and a moisturizing agent, and filtering the resulting mixture as occasion demands.

Preferred permeability controlling solvent includes, for instance, primary alcohols such as isopropanol and n-propanol; polyhydric alcohols such as ethylene glycol, propylene glycol, diethylene glycol, triethylene glycol, polyethylene glycol, grycerol; ethers of polyhydric alcohols, such as diethylene glycol monobutyl ether, diethylene glycol diethyl ether and triethylene glycol monobutyl ether; acetates of polyhydric alcohols; nitrogen-containing compounds such as N-methyl-2-pyrrolidone, 2-pyrrolidinone and 1,3-dimethyl imidazolidinone; and the like. Among them, isopropanol, 2-pyrrolidinone, diethylene glycol monobutyl ether and triethylene glycol monobutyl ether are preferable. These permeability controlling solvents can be used alone or in admixture of at least two kinds.

The content of the permeability controlling solvent in the water-based ink is preferably 5 to 35% by weight, more preferably 10 to 30% by weight.

Additives such as a surfactant, a pH adjusting agent and an antiseptic can be used in the water-based ink of the present invention, as occasion demands, within a range which would not hinder the object of the present invention.

The water-based ink of the present invention contains water as balance so that each ingredient as described above is contained in a desired amount. The content of the water in the water-based ink is preferably 50 to 95% by weight.

EXAMPLES

The following examples further describe and demonstrate embodiments of the present invention. The examples are given solely for the purpose of illustration and are not to be construed as limitations of the present invention.

Preparation Example 1

(1) Synthesis of Vinyl Polymer

Nitrogen gas replacement was sufficiently carried out in a 500-mL separable flask equipped with a dropping funnel and a Dimroth condenser. Thereafter, the flask was charged with 20 g of behenyl methacrylate, 4 g of methacrylic acid, 16 g of methyl methacrylate, 0.4 g of 2-mercaptoethanol and 10 g of 2-butanone, and the temperature of the ingredients was raised to 60° C. under reflux. The dropping funnel was charged with 80 g of behenyl methacrylate, 16 g of methacrylic acid, 64 g of methyl methacrylate, 1.6 g of 2-mercaptoethanol, 1.6 g of 2,2'-azobis(2,4-dimethylvaleronitrile) and 40 g of 2-butanone, and the resulting mixture was added dropwise to the flask over a period of 3 hours. After the dropwise addition, the resulting mixture was aged for 2 hours, and 0.4 g of 2,2'-azobis(2,4-dimethylvaleronitrile) was added thereto. The resulting mixture was aged for additional 2 hours, and thereafter 150 g of 2-butanone was added thereto, to obtain a polymer solution of a vinyl polymer having a weight-average molecular weight of 6000.

(2) Aqueous Dispersion of Polymer Particles Containing Dye

The amount 2.5 g of a cyan dye commercially available from BASF under the trade name of Neozapon Blue 807 was dissolved in 25 g of toluene. To the solution was added 5.0 g of the polymer solution obtained in the above (1), and the resulting solution was sufficiently stirred to dissolve the polymer. After the dissolution of the polymer was confirmed, 1.45 g of 1 N aqueous potassium hydroxide and 125 g of purified waster were added, and the resulting solution was further sufficiently stirred. After stirring, the solution was subjected to emulsification for 20 minutes with an ultrasonic homogenizer at 400 μA. Thereafter, toluene was removed by heating under reduced pressure. Finally, the resulting emulsion was filtered through a filter having a pore size of 0.8 μm, to give an aqueous dispersion of the dye-containing polymer particles.

Comparative Preparation Example 1

(1) Synthesis of Vinyl Polymer

Nitrogen gas replacement was sufficiently carried out in a 500-mL separable flask equipped with a dropping funnel and a Dimroth condenser. Thereafter, the flask was charged with 30 g of dodecyl methacrylate, 2 g of acrylic acid, 8 g of methoxypolyethylene glycol #1000 methacrylate (NK ESTER M-230G commercially available from Shin-Nakamura Chemical Co., Ltd.), 0.4 g of 2-mercaptoethanol and 10 g of 2-butanone, and the temperature of the ingredients was raised to 60° C. under reflux. The dropping funnel was charged with 120 g of dodecyl methacrylate, 8 g of acrylic acid, 32 g of methoxypolyethylene glycol #1000 methacrylate, 1.6 g of 2-mercaptoethanol, 1.6 g of 2,2'-azobis(2,4-dimethylvaleronitrile) and 40 g of 2-butanone, and the resulting mixture was added dropwise to the flask over a period of 3 hours. After the dropwise addition, the resulting mixture was aged for 2 hours, and 0.4 g of 2,2'-azobis(2,4-dimethylvaleronitrile) was added thereto. The resulting mixture was aged for additional 2 hours, and thereafter 150 g of 2-butanone was added thereto, to obtain a polymer solution of a vinyl polymer having a weight-average molecular weight of 6500.

(2) Aqueous Dispersion of Polymer Particles Containing Dye

The amount 2.5 g of a magenta dye commercially available from Orient Chemical Co., Ltd. under the trade name of Oil Pink 312 was dissolved in 25 g of toluene. To the solution was added 5.0 g of the polymer solution obtained in the above (1), and the resulting solution was sufficiently stirred to dissolve the polymer. After the dissolution of the polymer was confirmed, 1.74 g of 1 N aqueous potassium hydroxide and 125 g of purified water were added, and the resulting solution was further sufficiently stirred.

After stirring, the solution was subjected to emulsification for 20 minutes with an ultrasonic homogenizer at 400 μA. Thereafter, toluene was removed by heating under reduced pressure. Finally, the resulting emulsion was filtered through a filter having a pore size of 0.8 μm, to give an aqueous dispersion of the dye-containing polymer particles, in which the dye was incorporated in the vinyl polymer.

Comparative Preparation Example 2

(1) Synthesis of Vinyl Polymer

Nitrogen gas replacement was sufficiently carried out in a 500-mL separable flask equipped with a dropping funnel and a Dimroth condenser. Thereafter, the flask was charged with 30 g of styrene, 2 g of maleic anhydride, 8 g of ethyl methacrylate, 0.4 g of 2-mercaptoethanol and 10 g of 2-butanone, and the temperature of the ingredients was raised to 60° C. under reflux. The dropping funnel was charged with 120 g of styrene, 8 g of maleic anhydride, 32 g of ethyl methacrylate, 1.6 g of 2-mercaptoethanol, 1.6 g of 2,2'-azobis(2,4-dimethylvaleronitrile) and 40 g of 2-butanone, and the resulting mixture was added dropwise to the flask over a period of 3 hours. After the dropwise addition, the resulting mixture was aged for 2 hours, and 0.4 g of 2,2'-azobis(2,4-dimethylvaleronitrile) was added thereto. The resulting mixture was aged for additional 2 hours, and thereafter 27 g of dodecy alcohol and 0.09 g of triethylamine were added thereto, and the resulting mixture was aged for 3 hours. Thereafter, 150 g of 2-butanone was added, to give a polymer solution of a vinyl polymer having a weight-average molecular weight of 7200.

(2) Aqueous Dispersion of Polymer Particles Containing Dye

The amount 2.5 g of a yellow dye commercially available from Arimoto Kagaku K. K. under the trade name of Oil Yellow 129 was dissolved in 25 g of toluene. To the solution was added 5.0 g of the polymer solution obtained in the above (1), and the resulting solution was sufficiently stirred to dissolve the polymer. After the dissolution of the polymer was confirmed, 1.63 g of 1 N aqueous potassium hydroxide and 125 g of purified water were added, and the resulting solution was further sufficiently stirred. After stirring, the solution was subjected to emulsification for 20 minutes with an ultrasonic homogenizer at 400 μA. Thereafter, toluene was removed by heating under reduced pressure. Finally, the resulting emulsion was filtered through a filter having a pore size of 0.8 μm, to give an aqueous dispersion of the dye-containing polymer particles.

Comparative Preparation Example 3

(1) Synthesis of Vinyl Polymer

Nitrogen gas replacement was sufficiently carried out in a 500-mL separable flask equipped with a dropping funnel and a Dimroth condenser. Thereafter, the flask was charged with 11 g of methacrylic chloride, 16 g of methyl methacrylate, 0.27 g of 2-mercaptoethanol and 10 g of 2-butanone, and the temperature of the ingredients was raised to 60° C. under reflux. The dropping funnel was charged with 42 g of methacrylic chloride, 64 g of methyl methacrylate, 2.40 g of 2-mercaptoethanol, 1.06 g of 2,2'-azobis(2,4-dimethylvaleronitrile) and 40 g of 2-butanone, and the resulting mixture was added dropwise to the flask over a period of 3 hours. After the dropwise addition, the resulting mixture was aged for 2 hours, and 0.27 g of 2,2'-azobis(2,4-dimethylvaleronitrile) was added thereto. The resulting mixture was aged for additional 3 hours, and thereafter 75 g of dodecylamine and 28 g of triethylamine were added thereto, and the resulting mixture was aged for additional 3 hours. Thereafter, 150 g of 2-butanone was added thereto, and the resulting mixture was filtered through a membrane filter having a pore size of 3 µm. All the solvent was once distilled off under reduced pressure, and 230 g of 1 N aqueous potassium hydroxide was added. The resulting solution was stirred for 3 hours, and filtered. The residue was washed three times with water, and the filtrate was filtered again and dried. 150 g of 2-butanone was added to dissolve the polymer to obtain a polymer solution of a vinyl polymer having a weight-average molecular weight of 7500.

(2) Aqueous Dispersion of Polymer Particles Containing Dye

The amount 2.5 g of a yellow dye commercially available from BASF under the trade name of Neopen Yellow 075 was dissolved in 25 g of toluene. To the solution was added 5.0 g of the polymer solution obtained in the above (1), and the resulting solution was sufficiently stirred to dissolve the polymer. After the dissolution of the polymer was confirmed, 1.45 g of 1 N aqueous potassium hydroxide and 125 g of purified water were added, and the resulting solution was further sufficiently stirred. After stirring, the solution was subjected to emulsification for 20 minutes with an ultrasonic homogenizer at 400 µA. Thereafter, toluene was removed by heating under reduced pressure. Finally, the resulting emulsion was filtered through a filter having a pore size of 0.8 µm, to give an aqueous dispersion of the dye-containing polymer particles.

Example 1 and Comparative Examples 1 to 3

There were mixed 8 parts by weight of the aqueous dispersion of the dye-containing polymer particles obtained in each of Preparation Example 1 and Comparative Preparation Examples 1 to 3, 10 parts by weight of trimethylglycine, 5 parts by weight of urea, 5 parts by weight of triethylene glycol monobutyl ether, 1 part by weight of sodium 2-ethylhexylsulfosuccinate and 71 parts by weight of purified water. The resulting mixed solution was filtered through a 0.5 µm-filter [acetylcellulose membrane, outside diameter: 2.5 cm, commercially available from Fuji Photo Film Co., Ltd.] placed in a 25-mL syringe [commercially available from TERUMO CORPORATION] without a needle, to remove coarse particles, thereby giving a water-based ink.

The water-based ink obtained in Example 1 is excellent in color tone and rubbing resistance.

Next, the physical properties of the water-based inks obtained were evaluated in accordance with the following methods. The results are shown in Table 1.

[Evaluation]

(1) Optical Density

The water-based ink mentioned above is filled in an ink cartridge BCI-21e for an inkjet printer commercially available from CANON INC., and the cartridge is set in the inkjet printer BJC-430J commercially available from CANON INC. Solid image printing is carried out on a common paper also usable for inkjet printing [commercially available from CANON INC., trade name: common paper also usable for inkjet printing PB Paper]. The printed paper is left in air at 25° C. for 1 hour, and thereafter the optical density is measured by means of Macbeth densitometer RD914.

(2) Printing Reliability

Two thousand sheets of a document in the test format are printed out on the above-mentioned paper using the above printer. The appearances of printed characters before and after the test are compared, and evaluated on the basis of the following evaluation criteria.

[Evaluation Criteria]

○: No clogging and no distortion are observed in printed characters.

Δ: No clogging but slight distortion is observed in printed characters (problematic in practical use).

×: Generation of clogging is observed.

Example 2 and Comparative Examples 4 to 6

Water was added to 5 parts by weight of the solids contained in the aqueous dispersion of the dye-containing polymer particles obtained in each of Preparation Example 1 and Comparative Preparation Examples 1 to 3 and 5 parts by weight of the permeability controlling solvent given below or 1 part by weight of the surfactant given below to make up to 100 parts by weight, to give each of the water-based ink of Example 2 and Comparative Examples 4 to 6, in order. This water-based ink was placed in a bottle made of a fluororesin, and stored under an environment at 60° C. for three months. Tests were conducted by the methods described below, and the ratio of retaining viscosity or average particle diameter was calculated before and after the storage of the ink. The allowable range of the ratio of retaining viscosity or average particle diameter of the ink before and after the storage test is 90 to 110%, respectively.

(Permeability Controlling Solvent)

Isopropanol, 2-Pyrrolidinone, Diethylene glycol monobutyl ether and Triethylene glycol monobutyl ether (Surfactant)

Acetylenol EH [Kawaken Fine Chemical K.K., trade name]

(1) Viscosity

The viscosity was determined at 20° C. and 100 r/min using RE80L VISCOMETER (Rotor 1) commercially available from Toki Sangyo K.K.

(2) Average Particle Diameter

The average particle diameter of the polymer particles containing a colorant, being contained in an ink (hereinafter referred to as the average particle diameter before storage) was determined 20° C. using a laser particle analyzer system commercially available from Otsuka Denshi K.K. under the trade name of ELS-8000.

(3) Ratio of Retaining Viscosity or Average Particle Diameter

The ratio of retaining viscosity or average particle diameter was determined by the equation:

[Ratio of Retaining Viscosity or Average Particle Diameter]=([Average Particle Diameter or Viscosity after Storage]/[Average Particle Diameter or Viscosity before Storage])×100

The results are shown in Tables 2 and 3.

(4) Method for Determining Weight Average Molecular Weight

A polymer sample was isolated by drying a part of the polymer solution under reduced pressure at 105° C. for 2 hours, to remove the solvent. The weight-average molecular weight of the polymer was determined by gel permeation chromatography using polystyrene as a standard substance and chloroform containing 1 mmol/L dodecyldimethylamine as a solvent.

TABLE 1

|  | Optical Density | Printing Reliability |
|---|---|---|
| Example No. | | |
| 1 | 1.06 | ○ |
| Comparative Example | | |
| 1 | 1.05 | Δ |
| 2 | 1.03 | Δ |
| 3 | 1.01 | Δ |

TABLE 2

| | Ratio of Retaining Viscosity (%) | | | | |
|---|---|---|---|---|---|
| | Isopropanol | 2-Pyrrolidinone | Diethylene Glycol Monobutyl Ether | Triethylene Glycol Monobutyl Ether | Acetylenol EH |
| Example No. | | | | | |
| 2 | 98 | 103 | 104 | 100 | 100 |
| Comp. Ex. | | | | | |
| 4 | 125 | 124 | 126 | 136 | 123 |
| 5 | 129 | 120 | 125 | 120 | 129 |
| 6 | 132 | 133 | 128 | 130 | 128 |

TABLE 3

| | Ratio of Retaining Average Particle Diameter (%) | | | | |
|---|---|---|---|---|---|
| | Isopropanol | 2-Pyrrolidinone | Diethylene Glycol Monobutyl Ether | Triethylene Glycol Monobutyl Ether | Acetylenol EH |
| Example No. | | | | | |
| 2 | 99 | 102 | 99 | 97 | 104 |
| Comp. Ex. | | | | | |
| 4 | 125 | 142 | 128 | 142 | 127 |
| 5 | 121 | 136 | 127 | 115 | 120 |
| 6 | 132 | 146 | 129 | 121 | 124 |

It can be seen from the results show in Tables 1 to 3 that the water-based ink obtained in each example is excellent in storage stability and printing reliability, and exhibits high optical density.

Accordingly, the water-based ink of the present invention can be suitably used as, for instance, an ink for inkjet recording, and the like.

What is claimed is:

1. A water-based ink comprising an aqueous dispersion of polymer particles, wherein said polymer particles comprise (a) of a water-insoluble polymer having an alkyl group of 20 to 31 carbon-atoms in its side chain and an acid value of 31 to 120 mg KOH/g, and (b) a hydrophobic dye.

2. The water-based ink according to claim 1, wherein the hydrophobic dye is at least one dye selected from the group consisting of a copper phthalocyanine dye, a quinophthalone dye and a xanthene dye.

3. The water-based ink according to claim 1, wherein the water-insoluble polymer is a vinyl polymer prepared by copolymerizing a monomer composition comprising a monomer represented by Formula (I):

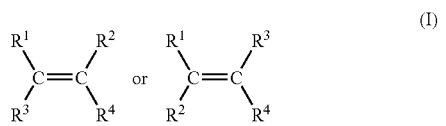

wherein each of $R^1$ and $R^2$ is independently hydrogen atom or methyl group; $R^3$ is hydrogen atom, carboxyl group, a —COOR$^5$ group wherein $R^5$ is an alkyl group having 20 to 30 carbon atoms, or a —CONR$^5$R$^6$ group wherein $R^5$ is as defined above and $R^6$ is hydrogen atom, an alkyl group or an aryl group; $R^4$ is a —COOR$^5$ group wherein $R^5$ is as defined above, or a —CONR$^5$R$^6$ group wherein $R^5$ and $R^6$ are as defined above, a salt-forming group-containing monomer, and a monomer copolymerizable with the monomer represented by the Formula (I) and the salt-forming group-containing monomer.

4. The water-based ink according to claim 1, wherein the alkyl group in the side chain of the water-insoluble polymer is linear.

5. The water-based ink according to claim 1, wherein the water-based ink further comprises 5 to 35% by weight of a permeability controlling solvent.

6. The water-based ink according to claim 1, wherein said alkyl group is of 20 to 26 carbon atoms.

7. The water-based ink according to claim 1, wherein said alkyl group is of 22 to 26 carbon atoms.

8. The water-based ink according to claim 1, wherein said polymer contains a salt-forming group or a salt-forming group containing monomer which is neutralized.

9. The water-based ink according to claim 1, wherein said water-insoluble polymer has a solubility in water at 25° of at most 15% by weight.

10. The water-based ink according to claim 1, wherein said water-insoluble polymer has a solubility in water at 25° of at most 10% by weight.

11. The water-based ink according to claim 1, wherein said water-insoluble polymer has a solubility in water at 25° of at most 5% by weight.

12. The water-based ink according to claim 1, wherein said water-insoluble polymer has a solubility in water at 25° C. of at most 1% by weight.

13. The water-based ink according to claim 1, wherein said water-insoluble polymer comprises 2 to 20 parts by weight of a salt-forming group-containing monomer.

14. The water-based ink according to claim 1, wherein said water-insoluble polymer comprises 5 to 15 parts by weight of a salt-forming group-containing monomer.

15. The water-based ink according to claim 5, wherein said permeability controlling solvent is at least one selected from the group consisting of isopropanol, 2-pyrrolidinone, diethylene glycol monobutyl ether, triethylene glycol monobutyl ether and a mixture thereof.

16. The water-based ink according to claim 1, wherein said water-based ink further comprises 10 to 30 wt. % of a permeability controlling solvent.

* * * * *